Oct. 1, 1968 J. R. CONRATH 3,404,388

NOISE SUPPRESSION CIRCUIT

Filed Feb. 2, 1965 2 Sheets-Sheet 1

INVENTOR
J. R. CONRATH
BY William H. Kamstra
ATTORNEY

Oct. 1, 1968 J. R. CONRATH 3,404,388

NOISE SUPPRESSION CIRCUIT

Filed Feb. 2, 1965 2 Sheets-Sheet 2

United States Patent Office 3,404,388

Patented Oct. 1, 1968

3,404,388

NOISE SUPPRESSION CIRCUIT

Jules R. Conrath, Salisbury Township, Lehigh County, Pa., assignor to Bell Telephone Laboratories, Incorporated, New York, N.Y., a corporation of New York Filed Feb. 2, 1965, Ser. No. 429,844
11 Claims. (Cl. 340—174)

This invention relates to magnetic memory arrangements and particularly to circuits adapted for the suppression of noise signals generated therein by the operation of certain access switches.

In conventional, three-dimensional, word-organized magnetic memories, a plurality of planes, each having a coordinate array of bit addresses located thereon may in turn be organized so that the word addresses are defined by the corresponding rows in the planes. The columns of the planes then define corresponding bit addresses of the words. In this memory organization it is apparent that the information word addresses are themselves also determinable in terms of the coordinates of a two-coordinate array. Access to the information word addresses may then be had by means of drive windings coupled respectively to the bit addresses of each of the words, which drive windings are selected on the basis of their coordinates in this two-coordinate array.

In such a memory organization, it is well known to provide energization current pulses to the word drive windings by means of an access switch comprising a coordinate array of magnetic cores, each of the cores being coupled to its corresponding drive winding in the memory. A continuously applied bias maintains the cores in one direction of magnetization. When access is required to a particular word address of the memory, the core of the access switch coupled to the drive winding of the particular word address is selected by means of familiar coincident current techniques. That is, half-select current pulses are applied to the two coordinate conducters defining the core of the switch to be selected. The coincidence of the two half-select pulses at the selected core causes it to switch from its normal magnetic state to the opposite magnetic state thereby to induce a drive current in the coupled drive winding of the memory. At the termination of the half-select currents, the bias restores the selected core to its normal magnetic state.

The selection of a core in the access switch, and thereby a drive winding of the memory, obviously must apply half-select magnetomotive drives to each of the other unselected cores appearing in the two coordinates of the access switch in which the selected core appears. As a result, each of these cores is caused to "shuttle" along its hysteresis loop and induce a small shuttle voltage in its coupled drive windings. These small voltages cause corresponding small energizations of the bit storage addresses lying along these drive windings which in turn cause an unwanted generation of small output signals during the access operation even though the information stored in the unselected word addresses is not permanently disturbed. In the unselected word addresses which lie in the plane which parallels an energized coordinate conductor of the access switch, these noise signals are additive since they appear in the same sensing conductors of the memory plane. In aggravated instances the cumulative noise signals may be of the same order of magnitude as the information-representative output signals. The coincident current operation of the access switch may thus constitute a major source of noise in a magnetic memory which may seriously affect memory operation and interfere with the detection of desired information output signals.

One advantageous circuit arrangement for substantially reducing shuttle voltages generated in unselected drive windings is described in the copending application of the present inventor, Ser. No. 310,999, filed Sept. 24, 1963, now Patent No. 3,374,474. In this arrangement a nonlinear suppression inductance in the form of a toroidal core is coupled to each of the drive windings alone. These cores present a high inductance to the shuttle currents induced in the drive windings of the unselected word addresses. On the other hand, in the drive winding of the selected word address, the output of the selected core of the access switch quickly saturates the suppression core after which a much lower inductance is presented. In practice the suppression core is substantially smaller than the associated core of the access switch to meet the requirement that the saturation flux of the suppression core be greater than the flux shuttle in a half-selected core of the switch, but substantially less than the flux switched in a selected core of the switch.

Although the foregoing shuttle suppression circuit arrangement has proved highly effective, in particular memory applications it may be required to achieve even greater suppression of the unwanted shuttle signals. This, of course, could be accomplished by increasing the inductance by means of a corresponding increase in the size of the suppression cores, or, for example, by employing two suppression cores instead of one. However, in the latter possibility, although the inductance would be doubled, the suppression core flux would also be doubled thus necessitating an increase in the flux capacity of the associated core in the access switch. The inductance could also be increased without a proportional increase in flux linkage by increasing the number of turns of the drive winding on the suppression cores. Each of these methods, although achieving improved suppression of noise signals, adds substantially to the labor and number of components in the fabrication of a large capacity memory and, therefore, adds to its cost. These methods of improved noise suppression, in adding complexity, also run counter to the present trend toward greater simplification in fabrication and constructions of memories to render them more adaptable for automated assembly techniques.

A highly advantageous and novel method and construction of a magnetic memory, for example, is described in the copending application of J. C. McAlexander, Jr., Ser. No. 359,950, filed Apr. 15, 1964. In this construction the aforementioned drive windings take the form of a flat continuous conductive strip mounted in a nonmagnetic, nonconductive surface in parallel, alternating directions. At each reversal point, the alternating strip has a tab projecting therefrom beyond the edge of the mounting surface and when the surface is folded along a centerline, the alternating strip is also folded along a centerline, the alternating strip is also folded to form a plurality of individual drive winding loops. The winding loops are folded around and coupled to the bit addresses of the information words of the memory, the bit addresses in the exemplary memory described in the McAlexander copending application comprising segments of well known magnetic wire memory elements. From this construction it will be apparent that each drive winding loop on one side of the bit addresses is connected to the drive winding loop of one adjacent information word and on the other side of the bit addresses is connected to the drive winding loop of the other adjacent information word, with a tab projecting at each midpoint between the information words. The construction so far briefly described is completed by its coupling with the cores of the access switch which is advantageously accomplished by connecting the projecting tabs to a common conductor carrying a row of cores at points between adjacent cores. The segments of the common conductor between the tab connections thus complete the drive winding loops of the memory. The drive windings are thus conveniently formed with each being physically connected with its adjacent windings but electrically isolated therefrom since, during an access cooperation, only one drive winding loop is energized by its coupled core.

It is an object of this invention to employ the advantageous construction described in the McAlexander copending application to achieve a substantial improvement in the performance of noise suppression cores of a magnetic memory without an attendant increase in its complexity or difficulty of fabrication.

It is another object of this invention to achieve a new and novel noise suppression circuit in access switches for magnetic memories.

It is also an object of this invention to increase the efficiency of noise suppression cores in access switches for magnetic memories.

Still another object of this invention is to provide an improved access switch for magnetic memories.

The foregoing and other objects of this invention are realized electrically by intercoupling the suppression core of one drive winding loop with its next adjacent drive winding loop in a manner so that each drive winding loop has coupled thereto two suppression cores and each suppression core couples two drive winding loops. The drive winding loops are coupled to their access switch cores in alternating senses with the result that the access drive currents for the memory alternate in direction in adjacent drive windings. In this manner the magnetomotive forces generated in the two suppression cores of a drive winding loop are additive. Physically, the coupling of the two suppression cores is advantageously accomplished by simply slipping a suppression core around each of the tabs of the continuous strip which forms the drive windings as briefly described in the foregoing. The mere added step in the fabrication of the memory of placing the suppression cores on the tabs, which tabs in any case already exist, is more than offset by the very large improvement in the suppression effect of the cores.

It will be apparent from the organization of an access switch and the three-dimensional memory which it serves that, during a selection operation, the half-select current pulses applied to one coordinate conductor of the switch will tend to generate shuttle signals in each of the drive windings of its associated memory plane. On the other hand, the half-select current pulses applied to the other coordinate conductor will tend to generate shuttle signals in only corresponding single drive windings of the other planes with which windings this conductor is associated. In the former case, the effect of the suppression cores in reducing the generation of noise signals is advantageously quadrupled since each suppression core is linked to two shuttle noise signals and each drive winding is coupled to two suppression cores. In the latter case only one shuttle noise signal in each plane affects the suppression cores; however, even in this case, since there are two suppression cores per drive winding, their effect in reducing noise signals is doubled. A simplification in the fabrication of magnetic memories is thus achieved in accordance with this invention which at the same time achieves an advantageous reduction in noise signals which have heretofore presented an important problem in the operation of the memory.

The organization and features of this invention will be better understood from a consideration of the detailed description of an illustrative embodiment thereof which follows when taken in conjunction with the accompanying drawing in which.

Figure 1:
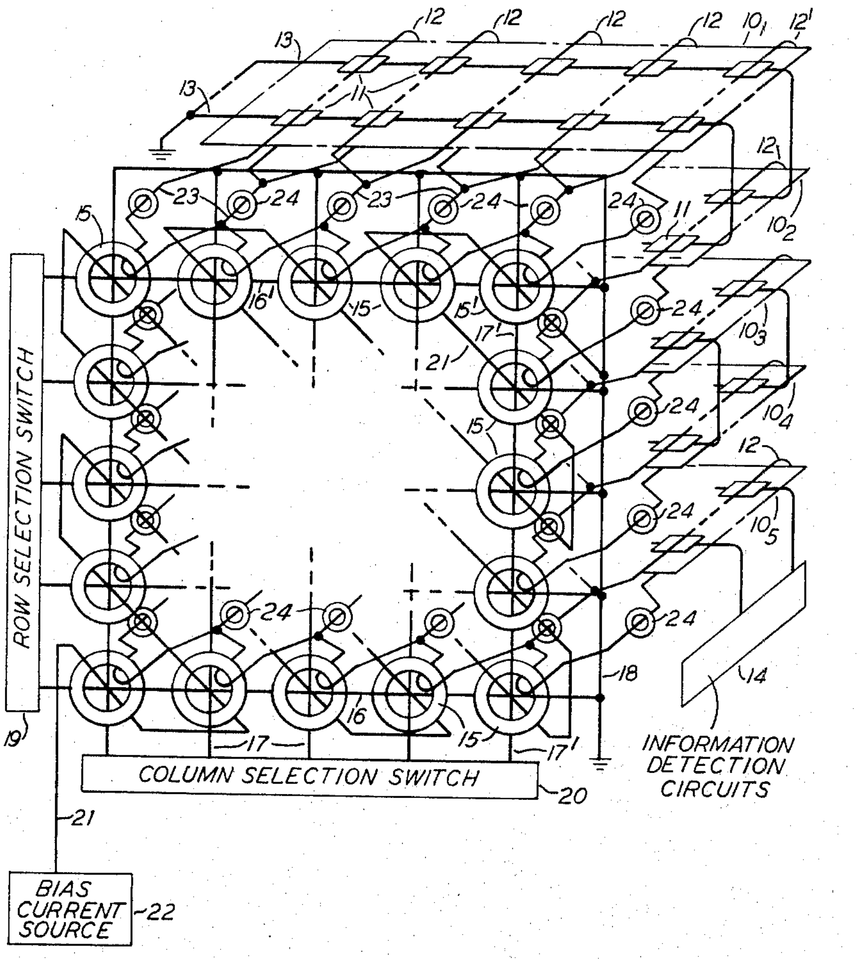
FIG. 1 depicts illustrative noise suppression circuits in accordance with this invention in association with a typical biased core access switch of a magnetic memory.

The electrical organization of a magnetic memory and the noise suppression circuits according to the principles of this invention is shown in FIG. 1 and comprises a plurality of planes $\mathbf{10}_1$ through $\mathbf{10}_5$. The planes 10 are represented in the drawing by broken line outlines and include therein rows and columns of information storage addresses 11. The addresses 11 may comprise any well known binary storage elements such as, for example, segments of magnetic wire memory elements, in connection with which the problem of shuttle noise generation is encountered. Since the principles of this invention are applicable to memories employing storage elements of various character, the addresses 11 are shown in block symbol only. The memory of FIG. 1 is word-organized, the rows of each of the planes 10 defining the information word addresses and the columns of the planes 10 defining the corresponding bit addresses of the words. Conventionally, each of the word rows of the planes 10 has associated therewith a drive winding 12 which is operatively coupled to each of the bit address elements 11 of its word row. The drive windings 12 are arranged to loop around the associated word row elements 11 in a manner to originate and terminate at the same side of a plane 10. A plurality of sensing conductors 13 are provided, respectively, for the columns of information storage elements 11 of each of the planes 10. These sensing conductors 13 are connected continuously from plane to plane passing in one direction along one plane and in the opposite direction along the adjacent plane and are operatively coupled serially to the corresponding bit storage elements 11 of the information words. The sensing conductors 13 are each connected at one end to ground and at the other end, that is, after passing through the last plane $\mathbf{10}_5$, to information detection circuits 14.

The organization so far described is well known in the prior art as is its associated access switch which comprises a coordinate array of toroidal magnetic cores 15. The cores 15 are arranged in their array so that each one corresponds to a word address of the multiplane memory with which the array is associated. The cores 15 are defined in the access switch by coordinate conductors 16 and 17 which thread the rows and columns of cores, respectively. To avoid complexity in the drawing, only the outer rows and columns of cores 15 of the access switch are shown and the switch is shown as constituting a 5×5 array serving five planes each having a capacity of five information words each. It will be appreciated that the switch and memory capacity has been selected for illustration only and is not to be understood as limiting the application of the noise suppression circuits of this invention.

The coordinate selection conductors 16 and 17 are each connected at one end to a ground bus 18 and at their other ends to row and column selection switches 19 and 20, respectively. To complete the recitation of a conventional memory access switch, a continuous biasing conductor 21 threads each of the cores 15 and is also connected to the ground bus 18. At its other end the biasing conductor 21 is connected to a bias current source 22. The switches 19 and 20, the source 22, as well as the information detection circuits 14 are well known in the art and accordingly they are shown in block symbol only and will be described herein only to the extent of the function performed. As previously mentioned, each of the cores 15 of the access switch is associated with an individual word address of the memory and it provides the access current for the drive winding 12 coupled to the associated word row. Each drive winding 12, as its terminations appear on the same side of the planes 10, continues to a coupling with its associated core 15 of the access switch. A closed electrical loop is thus formed in which the drive current is induced during the operation of the access switch.

In accordance with the principles of this invention, each drive winding 12 shares a common circuit path 23 with its neighbor winding on each side. In the specific embodiment of this invention of FIG. 1, the drive windings 12 are further arranged so that any one common circuit path 23 connects together adjacent portions of two given drive windings on one side of a plane. The returning portions of the latter two drive windings on the other side of the plane are then connected to the drive windings adjacent on either side of the two given windings by the neighbor common circuit paths. As will appear from a description of the physical construction of a memory as schematicaly shown in FIG. 1, the portions of the drive windings 12 which are coupled to the bit addresses of the word rows present one continuous conductor which may be traced from word row to word row on the two sides of a plane.

On each common circuit path 23 of the adjoining drive windings 12 is coupled a suppressor magnetic core 24. The cores 24, only representative ones of which are shown in the drawing, each have nonlinear hysteresis characteristics and are formed to have as short a flux path as possible. For reasons which will become apparent hereinafter, the saturation flux of the cores 24 is substantially less, say by a factor of ten or twenty, than the flux switched by the complete switching of a core 15 of the access switch, although the saturation flux of the cores 24 is greater than the flux change in a core 15 generated by a half-select current pulse. It is apparent from the drawing that each loop of a drive winding 12 taken individually has two suppressor cores 24 coupled thereto and each suppressor core 24 is coupled, by virtue of the common circuit paths 23, to two drive windings 12.

For purposes of describing an illustrative access operation of the memory of FIG. 1, it will be unnecessary to consider the readout of particular exemplary stored information in the memory. The readout and the manifestation of the stored information as it is transmitted to the information detection circuits 14 is well known. The advantages of this invention are realized when the particular memory element or manner of magnetic storage of information is of a character which may generate noise signals responsive to shuttle currents encountered on the word row drive windings during an access operation. Accordingly, the selection of, and the application of a drive current to, one exemplary drive winding 12 will be considered together with the advantageous suppression of the shuttle currents incidentally generated thereby. For purposes of illustration it will be assumed that the drive winding 12′ lying in the first memory plane $10_1$ is to be selected for energization. This drive winding is defined by the core 15′ of the access switch, which core in turn is defined by the row and column conductors 16′ and 17′, respectively.

Each of the cores 15 of the access switch is being maintained in a particular direction of magnetization by the continuously applied bias current on the bias conductor 21, which current originates at the source 22. For reasons which will appear hereinafter, the direction of bias alternates with adjacent cores 15 of the rows of the access switch. Corresponding cores 15 of the rows are biased in the same direction. In order to select the core 15′ of the access switch the row and column selection switches 19 and 20 are controlled to apply half-select current pulses to the selection conductors 16′ and 17′, respectively. For purposes of illustration it will be assumed that these current pulses are positive in polarity and the conductors 16′ and 17′ are threaded through their respective cores 15 in a sense such that the magnetomotive drive generated by the current pulses is in a direction to oppose the magnetic bias being applied. In the conventional manner, the half-select current pulses partially drive the cores 15, occupying the row in which the selected core 15′ is found, along their hysteresis loops in the opposite magnetic direction. As a result of these flux excursions in the cores 15 along the conductor 16′, shuttle currents are ordinarily generated in the coupled drive windings 12. Similar shuttle currents are generated in the drive windings 12 coupled to the cores 15 along the conductor 17′ on which the selected core 15′ is also found. The core 15′ alone receives, via its defining selection conductors 16′ and 17′, the total magnetomotive drive developed by the additive half-select current pulses and, as a result, core 15′ is switched from one direction of magnetic saturation to the other. The resulting complete flux change in the core 15′ induces an energizing current pulse in the coupled drive winding 12′, which current pulse is operative in the conventional manner to interrogate the memory elements 11 of the selected word row. Also conventionally, output signals will be induced in the sensing conductors 13 in accordance with the information stored in the bit addresses. The information representative output signals will be transmitted to the information detection circuits 14 via the continuous sensing conductors 13 which pass along each of the planes 10 in alternating directions.

As discussed in the copending application of the present inventor cited hereinbefore, the operation of a suppressor core 24 depends on its ability to switch flux rapidly with a small drive current. In accordance with the principles of the present invention the suppressive effect is substantially increased in the drive windings 12 of the plane 10, or conversely, the generation of larger shuttle voltages by the unselected cores 15 may be tolerated. The suppressor cores 24 are employed in this invention in such a way that the electrical coupling between adjacent drive windings 12 of a plane 10 is provided. It will be recalled that the biasing and selection conductors of the access switch are threaded in a sense that the cores 15 generate in their coupled drive windings 12, drive currents of alternately opposite polarity for adjacent windings. As a result, the shuttle currents generated will induce additive magnetomotive forces in the suppressor cores 24. Since each core 24 is linked to two shuttle currents in a selected plane 10 and each drive winding 12 of a selected plane 10 is coupled to two suppressor cores 24, the effect of the cores 24 is quadrupled and the shuttle currents generated by the half-selected cores 15 along the row selection conductor 16′ of the embodiment of FIG. 1 are substantially reduced. The suppressor cores 24 associated with the selected core 15′ will be driven into saturation by the drive current generated by the switching core 15 after which the impedances presented by the latter cores 24 drop to substantially zero. The interrogation drive current pulse on the drive winding 12′ is thus diminished only negligibly. It may be noted that, although the cores 15 of a row of the access switch generate drive currents of alternating polarities in the drive windings 12 coupled thereto, the manner of arranging the physically connected drive winding loops on the two sides of a memory plane results in currents of the same direction for all the portions of the drive winding loops on the same side of a memory plane.

In the case of the nonselected cores 15 lying along the column conductor 17′ of the access switch, it is clear that only one drive winding 12 of each of the planes $10_2$ through $10_5$ is coupled to a shuttled core. As a result, only one shuttle current is linked to the two suppressor cores 24 of each of the latter drive windings. However, since, in accordance with this invention, there are two suppressor cores per drive winding, their effect in reducing shuttle current in each drive winding is doubled.

Figure 2:
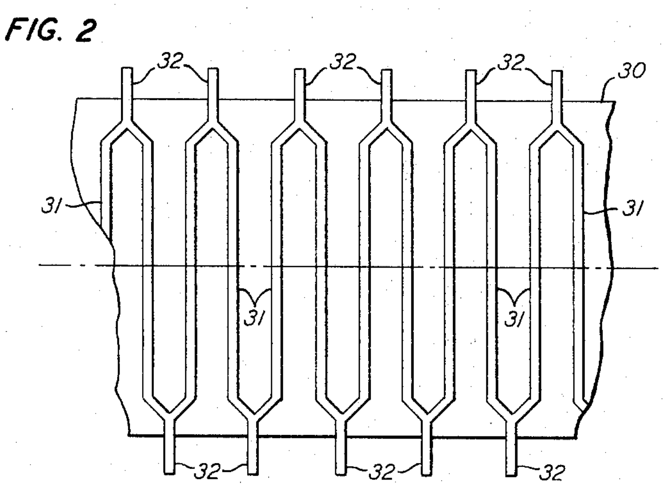
FIG. 2 shows a known magnetic memory drive winding subassembly which is advantageously adapted to carry out the principles of this invention.
Figure 3:
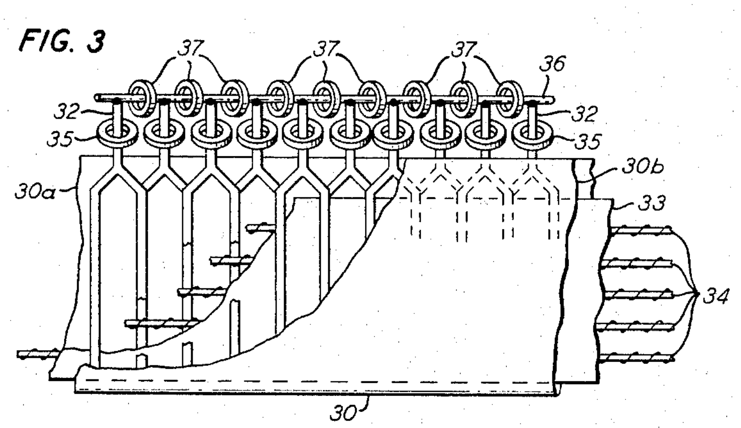
FIG. 3 is a fragmented view of a magnetic memory assembly incorporating the subassembly of FIG. 2 and showing a specific physical realization of the noise suppression circuits of this invention.

The electrical organization of this invention as schematically depicted in FIG. 1 is advantageously achieved in practice by the novel construction shown in FIGS. 2 and 3. In the copending application of McAlexander cited previously a novel drive winding subassembly is disclosed which is also shown in FIG. 2. This construction comprises an electrically nonconductive, nonmagnetic tape 30, which may be of the material commercially known as Mylar, and which has a continuous conductor 31 mounted thereon in parallel, alternating directions across the longitudinal axis of the tape, which axis is represented in the drawing by the broken center line. The conductor 31 advantageously has a flat cross section and at each reversal point has formed thereon a tab 32 which projects beyond the edges of the tape 30. The tape 30 and its continuous conductor 31 is particularly adapted to form the drive windings for the information word rows of magnetic memories employing as the basic storage elements, segments of magnetic wire memory elements such as are described for example, in the patent of A. H. Bobeck No. 3,083,353, issued March 26, 1963.

In FIG. 3 an exemplary construction employing the subassembly of FIG. 2 is depicted which is advantageously adapted to realize the electrical organization of this invention shown in FIG. 1. The tape 30, only a fragment of which is shown in both FIGS. 1 and 2, is folded on its center line around a tape containing the wire memory elements. This folded construction is depicted in FIG. 3 as broken away to show more clearly its details. The two halves 30*a* and 30*b* of the tape 30 are folded around the aforementioned center line substantially upon themselves to enclose therewithin the memory tape 33. The memory tape 33 is of a well known character which has affixed therein a plurality of parallelly arranged wire memory elements 34, only portions of which are shown in the drawing. As a result of the parallel alignments of the continuous conductor 31 as it passes and repasses in opposite directions, the two halves of the passes of the conductor 31 are in precise registration and the two halves thus formed define in each row the information addresses on the memory elements mounted with the tape 33. When the two halves of the tape 30 are pressed into contact with the tape 33, inductive coupling of the conductor 31 with the wire memory elements is also insured. In the folded arrangement of the tape 30, the tabs 32, which alternated on the two edges of the tape in the unfolded state, now appear successively where the two edges of the tape 30 meet. The tabs 32 correspond functionally and structurally to the common circuit paths 23 described in connection with the schematic drawing of this invention shown in FIG. 1.

At this stage in the construction of FIG. 3, a suppressor core 35 is slipped around each of the tabs 32 and, so placed, will be electrically in the positions indicated for the suppressor cores 24 of the memory organization of FIG. 1. An electrical conductor 36 threading a plurality of magnetic cores 37 is now assembled with the drive winding tabs 32 and is electrically connected thereto at each tab so that one core 37 lies on the conductor 36 between each pair of adjacent tabs 32. Each of the cores 37 is thus coupled to a drive winding loop made up of segments of the continuous conductor 31, the individual loops being readily traceable in FIG. 3. It is also apparent that a sequence of the cores 37 and the coupled drive winding loops together with their suppressor cores 35 are the equivalent of a row of cores 15 of the organization of FIG. 1. The advantages of maintaining the electrical components in the flexible tapes is obvious. The folded tape 30 enclosing the memory element tape 33 is adapted to fold and refold in alternate directions to form the planes 10 of the memory organization of FIG. 1 in the manner of the sensing conductors 13 of that figure. After the cores 37 have been arranged in a coordinate array by the folding operations, the coordinate selection conductors and the bias conductor may be threaded.

Figure 4:
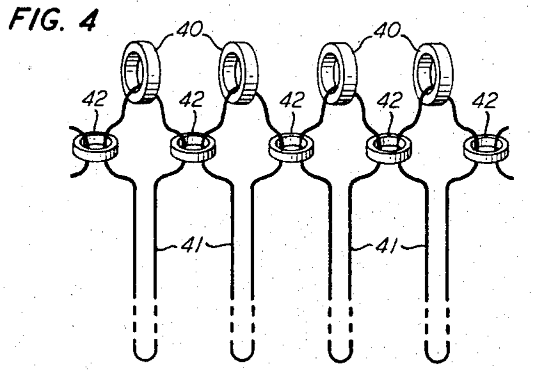
FIG. 4 shows another specific circuit arrangement for realizing the advantage of this invention.

Each of the embodiments of this invention so far described contemplates common conducting paths shared by adjacent drive winding loops. However, it will be appreciated that the principles of this invention are equally applicable where the drive winding loops are physically distinct and independent. Such an arrangement is shown in FIG. 4 where the access switch cores 40 are coupled to individual drive winding loops 41. In this embodiment of the invention, each suppressor core 42 is coupled to two adjacent drive winding loops 41 and, although the winding loops 41 are physically distinct, currents appearing in adjacent loops are coupled by the shared cores 42.

Although toroidal magnetic cores are contemplated in each of the embodiments described in the foregoing, it will be appreciated by one skilled in the art that other forms of inductance may be employed to carry out the principles of this invention. Thus, for example, instead of achieving the suppressor inductances by means of toroidal cores, the tabs 32 of the embodiment of FIG. 3 may be plated with a suitable magnetic material. The inductances could also be formed by tabs comprising short sections of the wire memory elements 33 used as storage means in the specific embodiment of FIG. 3.

Other arrangements will be envisioned by one skilled in the art without departing from the spirit and scope of this invention and the embodiments described are considered to be only illustrative of the principles of this invention.

What is claimed is:

1. A matrix switch comprising a plurality of magnetic cores arranged in rows and columns, an output circuit for each of said cores, each of said output circuits sharing a common conducting path with each of its adjacent output circuits, a plurality of row and column selection conductors threading said rows and columns of cores, respectively, means for applying half-select pulses to a selected row and column selection conductor, and means for suppressing shuttle currents in said output circuits comprising magnetic core means on each of said common conducting paths.

2. A matrix switch as claimed in claim 1 in which said magnetic core means comprises a closed flux loop core threaded on each of said common conducting paths.

3. A matrix switch as claimed in claim 1 in which said magnetic core means comprises magnetic material encircling each of said common conducting paths.

4. A matrix switch comprising a plurality of magnetic cores arranged in rows and columns, a plurality row and column selection conductors coupled to said rows and columns of cores, respectively, means for applying half-select coincident currents to a selected row and column selection conductor, an output circuit for each of said cores, each of said output circuits sharing a common conducting path with two others of said output circuits, and a suppressor core means coupled to each of said common conducting paths.

5. A matrix switch comprising a plurality of magnetic cores arranged in rows and columns, a plurality of row and column selection conductors coupled to said rows and columns of cores, respectively, an output circuit for each of said cores, each of said output circuits sharing a common conducting path with two others of said output circuits, and a suppressor core means coupled exclusively to each of said common conducting paths.

6. A matrix switch comprising a plurality of magnetic cores arranged in rows and columns, a plurality of row and column selection conductors coupled to said rows and columns of cores, respectively, an output circuit for each of said cores, and a pair of suppressor cores coupled to each of said output circuits, each of said suppressor cores also being coupled to an individual other one of said output circuits.

7. In a magnetic memory having a plurality of drive conductor loops, an access switch comprising a plurality of magnetic cores coupled respectively to said plurality of conductor loops, each of said cores having two stable remanent magnetic states, said switch, when activated, causing a selected core to switch from one remanent state to the other and causing others of said cores partially to switch thereby applying respectively an energizing drive pulse to the conductor loop coupled to said selected core and partial drive pulses to the conductor loops coupled to said others of said cores, and means for suppressing said partial drive pulses comprising a plurality of nonlinear inductors each coupled to the conductor loops of two of said cores so that each of said conductor loops is coupled to two of said nonlinear inductors.

8. In a magnetic memory having a plurality of drive conductor loops, an access switch as claimed in claim 7 in which each of said conductor loops shares a common conducting path with two others of said loops and in which each of said plurality of nonlinear inductors is coupled to one of said common conducting paths.

9. A magnetic memory construction for storing a plurality of binary information characters in rows and columns of magnetic storage addresses comprising a first continuous conductor encircling said storage addresses in a manner to present a plurality of loops each having a first and a second portion in substantial registration with said rows of storage addresses and in inductive coupling therewith, a plurality of magnetic cores each having an aperture therein, a second continuous conductor threading said aperture of each of said cores, a plurality of electrical connections between said second conductor and said first conductor between each of said loops, and a suppressor magnetic core coupled to each of said electrical connections.

10. An energizing circuit means for a first and a second information address row of a magnetic memory comprising a continuous first conductor passing in inductive coupling in one direction along the addresses of said first row from one end of said rows, returning to said one end and passing in inductive coupling in the same direction along the addresses of said second row from said one end of said rows, and returning to said one end, a first and a second magnetic core each having an aperture therein, a second conductor threading the apertures of both of said cores, electrical connections between said first conductor and said second conductor on each side of each of said cores at said one end of said rows of cores, and a suppressor core means coupled to each of said electrical connections.

11. In a magnetic memory arrangement, an access circuit construction comprising a plurality of drive winding loops coupled to the information rows of said memory arrangement, respectively, a plurality of magnetic cores, a conductor serially threading each of said cores, a plurality of electrical connections between one end of adjacent pairs of said loops and said conductor between adjacent cores, and a suppressor core coupled to each of said plurality of electrical connections.

References Cited

UNITED STATES PATENTS

| | | | |
|---|---|---|---|
| 3,068,452 | 12/1962 | Sarrafian | 340—174 |
| 3,238,516 | 3/1966 | Hore | 340—174 |
| 3,296,600 | 1/1967 | Einsele | 340—174 |
| 3,341,830 | 9/1967 | Conrath | 340—174 |
| 3,371,218 | 2/1968 | Russell | 307—88 |
| 3,374,474 | 3/1968 | Conrath | 340—174 |

STANLEY M. URYNOWICZ, Jr., *Primary Examiner.*